US008387012B2

(12) United States Patent
Advani

(10) Patent No.: US 8,387,012 B2
(45) Date of Patent: *Feb. 26, 2013

(54) DETERMINING DELTAS IN A SPATIAL LOCALITY OF A FUNCTION CALL GRAPH IN A SOURCE CONTROLLED SYSTEM

(75) Inventor: Pavan L. Advani, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 951 days.

This patent is subject to a terminal disclaimer.

(21) Appl. No.: 12/330,329

(22) Filed: Dec. 8, 2008

(65) Prior Publication Data

US 2010/0146484 A1 Jun. 10, 2010

(51) Int. Cl.
*G06F 9/44* (2006.01)

(52) U.S. Cl. ......................... 717/121; 717/133; 717/168

(58) Field of Classification Search .......... 717/120-135, 717/168; 711/171, 207; 719/316, 330
See application file for complete search history.

(56) References Cited

U.S. PATENT DOCUMENTS

| | | | | |
|---|---|---|---|---|
| 5,623,661 | A * | 4/1997 | Hon | 1/1 |
| 5,649,200 | A * | 7/1997 | Leblang et al. | 717/122 |
| 6,018,747 | A * | 1/2000 | Burns et al. | 1/1 |
| 6,564,370 | B1 | 5/2003 | Hunt | |
| 6,983,447 | B1 * | 1/2006 | Endicott et al. | 717/116 |
| 7,131,112 | B1 * | 10/2006 | Bartz et al. | 717/122 |
| 2003/0018964 | A1 | 1/2003 | Fox | |
| 2004/0117350 | A1 | 6/2004 | Cavage | |

OTHER PUBLICATIONS

Torrellas et al., False Sharing and Spatial Locality in Multiprocessor Caches; vol. 43, No. 6, 1994, IEEE, pp. 651-663.*
Johnson et al., Run-time Spatial Locality Detection and Optimization; 1997, IEEE, pp. 57-64.*
Kumar et al., Exploiting Spatial Locality in Data Caches using Spatial Footprints; 1998, IEEE, pp. 357-368.*
Vincent Kruskal, IBM J. Res. Develop, vol. 28, No. 1, Jan. 1984, pp. 74-81.*
Lindsay et al., A Generic Model for Fine Grained Configuration Management Including Version Control and Traceability, 1997 IEEE, pp. 27-36.*
Eick, S.G., et al. "Seesoft—A Tool for Visualizing Line Oriented Software Statistics," *IEEE Transactions on Software Engineering*, 18(11), Nov. 1992, pp. 957-968.
Abstract—Using Historical Data From Source Code Revision Histories to Detect Source Code Properties, Chadd Creighton Williams, Doctor of Philosophy, 2006, Professor Jeffrey K. Hollingsworth, Department of Computer Science, pp. 1-154.

* cited by examiner

*Primary Examiner* — Wei Zhen
*Assistant Examiner* — Satish Rampuria
(74) *Attorney, Agent, or Firm* — Hamilton, Brook, Smith & Reynolds, P.C.

(57) ABSTRACT

In and for software projects, arrangements for permitting a user to understand how the spatial locality of a function call may have changed with respect to any changes in a function definition. This permits an analysis of different workflows which use the same function, wherein the definition of the function may have changed. To the extent that there might be corresponding changes in the workflows which use such a function, the user will readily develop an idea of why some workflows changed and some did not. The invention method and apparatus determine and display deltas (changes) between different versions of a file where the function call occurs.

13 Claims, 3 Drawing Sheets

FIG. 2

| | Function definition of Stack::push | Function call of Stack::push | Function call of Stack::push |
|---|---|---|---|
| Release 3.0 | Dv1(Stack.cpp) | Dv1(Plates.cpp) | MemoryDemo.cpp |
| Release 2.0 | Stack.cpp | Plates.cpp | MemoryDemo.cpp |
| Release 1.0 | Stack.cpp | Plates.cpp | MemoryDemo.cpp |

FIG. 3

| | Function definition of Stack::push | Function call of Stack::push | Function call of Stack::push |
|---|---|---|---|
| Release 3.0 | Dv1(Stack.cpp) | Plates.cpp | MemoryDemo.cpp |
| Release 2.0 | Stack.cpp | Plates.cpp | MemoryDemo.cpp |
| Release 1.0 | Stack.cpp | Plates.cpp | MemoryDemo.cpp |

FIG. 4

| | Function definition of Stack::push | Function call of Stack::push | Function call of Stack::push |
|---|---|---|---|
| Release 3.0 | Stack.cpp | Plates.cpp | Dv1(MemoryDemo.cpp) |
| Release 2.0 | Stack.cpp | Plates.cpp | MemoryDemo.cpp |
| Release 1.0 | Stack.cpp | Plates.cpp | MemoryDemo.cpp |

FIG. 5

| | Function definition of Stack::push | Function call of Stack::push | Function call of Stack::push |
|---|---|---|---|
| Release 3.0 | Dv1(Stack.cpp) | Dv1(Plates.cpp) | Dv1(MemoryDemo.cpp) |
| Release 2.0 | Stack.cpp | Plates.cpp | MemoryDemo.cpp |
| Release 1.0 | Stack.cpp | Plates.cpp | MemoryDemo.cpp |

DETERMINING DELTAS IN A SPATIAL LOCALITY OF A FUNCTION CALL GRAPH IN A SOURCE CONTROLLED SYSTEM

BACKGROUND

In software projects, function definitions may change, but typically a user does not readily understand how the spatial locality of a function call may have changed with respect to any changes in a function definition, especially in response to reported errors or bugs. Accordingly, developers are typically not able to determine why some workflows using a given function may have changed while others did not.

Put another way, it is rarely the case that implementers of classes ask or require anyone to check for preliminary (or initial) conditions before an operation takes place, or for post-conditions after an operation takes place. Thus, with any changes in the spatial locality of a call, a software developer will not be able to get a good idea of what can be done to resolve any errors that may crop up.

BRIEF SUMMARY

Broadly contemplated herein, in accordance with at least one embodiment of the invention, is the presentation to the user of a GUI (graphical user interface) in a Source Control System, wherein this GUI will list the changes (or deltas) in the spatial locality of a function call over a set of versions of source files.

By way of example, the spatial locality of a function call could be represented by the number of lines around the function call, the entire function scope in which the function call was made, or the scope of the class in which the function call was made. The user may select one of these types of spatial locality in order to obtain a result set, itself containing all the details regarding the changes around a function call over a set of versions including the changes in the function definition. This will help the user to track workflows and to thereby understand and appreciate how and why workflows may have changed over time.

In summary, this disclosure describes a method including querying for a software function call towards determining spatial locality of the function call; further querying for a scope of review of the function call; computing deltas between different versions of a file where the function call occurs; and displaying the computed deltas to the user.

This disclosure also describes an apparatus including a main memory; a querier which queries for a software function call towards determining spatial locality of the function call; the querier further acting to query for a scope of review of the function call; a determiner which computes deltas between different versions of a file where the function call occurs; and a display arrangement which displays the computed deltas to the user.

Furthermore, this disclosure also describes a program storage device readable by machine, tangibly embodying a program of instructions executable by the machine to perform a method including querying for a software function call towards determining spatial locality of the function call; further querying for a scope of review of the function call; computing deltas between different versions of a file where the function call occurs; and displaying the computed deltas to the user.

For a better understanding of the embodiments of the invention, together with other and further features and advantages thereof, reference is made to the following description, taken in conjunction with the accompanying drawings, and the scope of the invention will be pointed out in the appended claims.

BRIEF DESCRIPTION OF THE SEVERAL VIEWS OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 2-5 provide illustrative examples of GUI's providing basic, high-level information by way of tracing sources of errors.

DETAILED DESCRIPTION

Figure 1:
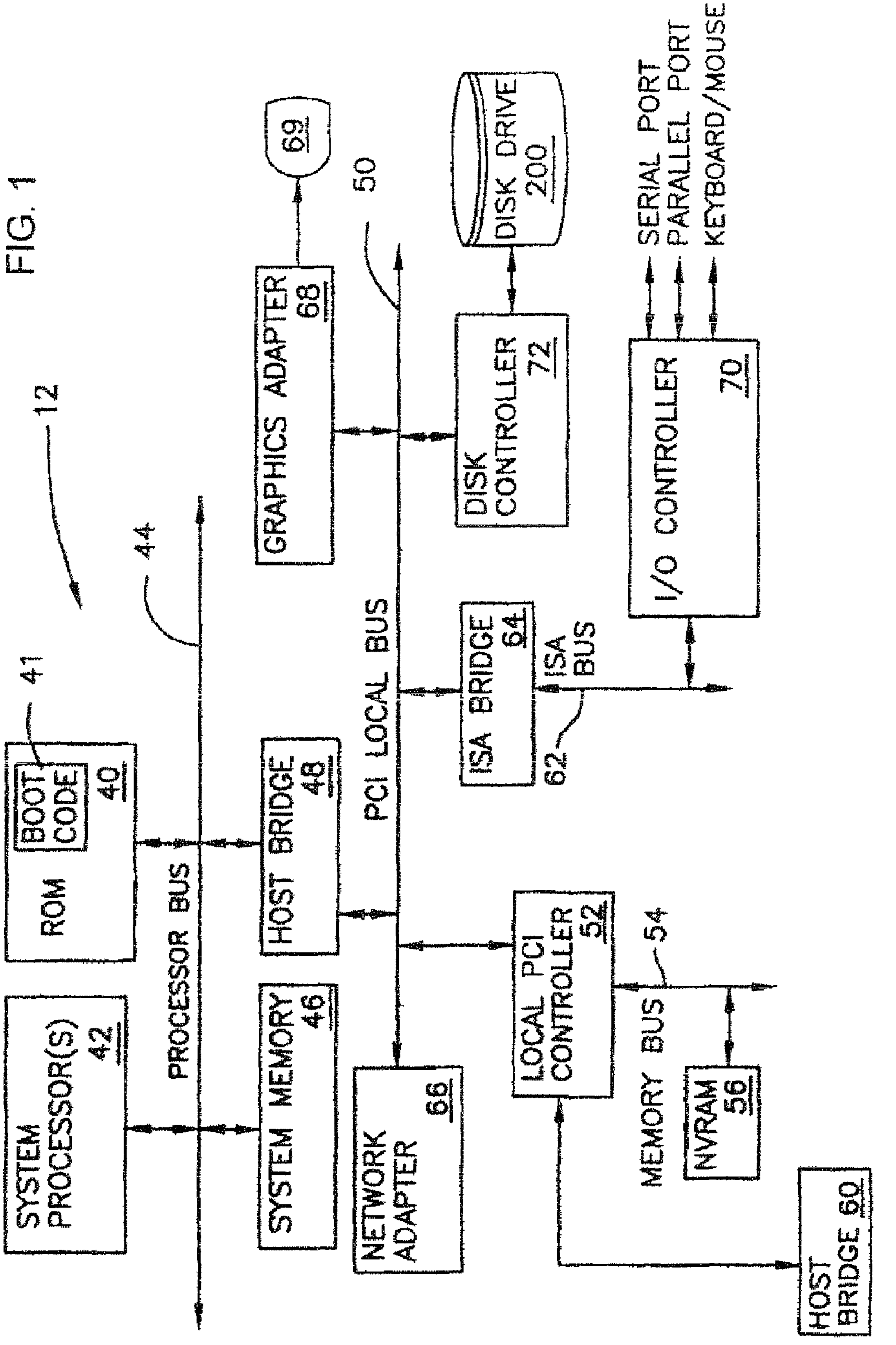
FIG. 1 schematically illustrates a computer system.

For a better understanding of embodiments of the invention, together with other and further features and advantages thereof, reference is made to the following description, taken in conjunction with the accompanying drawings, and the scope of the invention will be pointed out in the appended claims.

It will be readily understood that the components of the embodiments of the invention, as generally described and illustrated in the Figures herein, may be arranged and designed in a wide variety of different configurations. Thus, the following more detailed description of the embodiments of the apparatus, system, and method of the present invention, as represented in FIGS. 1 through 5, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring aspects of the embodiments of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the embodiments of the invention as claimed herein.

Referring now to FIG. 1, there is depicted a block diagram of an illustrative embodiment of a computer system 12, which may be employed in accordance with one or more embodiments of the present invention. It is to be understood that the system 12 shown in FIG. 1 is provided by way of an illustrative and non-restrictive example, and that of course other types of computer systems can be employed with the embodiments of the invention set forth herein.

The illustrative embodiment depicted in FIG. 1 may be a notebook computer system, such as one of the ThinkPad® series of personal computers previously sold by the International Business Machines Corporation of Armonk, N.Y., and now sold by Lenovo (US) Inc. of Morrisville, N.C.; however, as will become apparent from the following description, embodiments of the invention are applicable to any data processing system. Notebook computers may alternatively be referred to as "notebooks", "laptops", "laptop computers" or "mobile computers" herein, and these terms should be understood as being essentially interchangeable with one another.

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a LAN, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports. A disk controller 72 is in communication with a disk drive 200. Of course, it should be appreciated that the system 12 may be built with different chip sets and a different bus structure, as well as with any other suitable substitute components, while providing comparable or analogous functions to those discussed above.

As mentioned heretofore, system 12 shown in FIG. 1 is merely provided by way of an illustrative and non-restrictive example of a system in which (or in the context of which) embodiments of the present invention may be employed. The disclosure now turns to a discussion of methods and arrangements for carrying out embodiments of the present invention.

A user will be presented with a dialog asking him or her to input a function name whose spatial locality is desired to be analyzed and also to input: a number of lines around the function call, the entire function scope in which the function call was made, or the scope of the class in which the function call was made. The dialog can be presented as a standard dialog box which pops up on a screen, or can be embodied by essentially any other suitable arrangement. Deltas are then computed between versions of each file where the function call occurs, and these deltas are displayed to the user. Such computation can take place via essentially any suitable arrangement, e.g., in a system processor such as that indicated at 42 in FIG. 1.

An illustrative and non-restrictive example of the functioning of such a procedure can be appreciated by the remaining figures. The example here involves the following classes: Stack, Plates and MemoryDemo. The Plates and MemoryDemo classes use the Stack class for their implementation by having Stack instance variables in their class definition and then performing operations on it. This can be appreciated from FIG. 2, which shows a GUI displaying three files: Stack.cpp, Plates.cpp, MemoryDemo.cpp. To further this working example, the call of Stack::push will be addressed. Such a GUI, of course, can appear on a computer display such as that indicated at 69 in FIG. 1.

For illustration purposes, Dv1(Stack.cpp) indicates a change in the "push" function definition of the Stack class, while Dv1(Plates.cpp) indicates that changes happened in the spatial locality of the push function call, that is, changes happened around the usage of this call.

Accordingly, in FIG. 2, the bottommost row in the GUI shows the initial spatial locality of the function call Stack::push; this would be the initial version of all three files (here designated as Release 1.0). The second (middle) row (corresponding to another software version, here "Release 2.0"), for its part, shows that no change happened in either the function definition of the Stack::push function nor in the spatial locality of the function call; the lack of change can be conveyed by similar colors in the two rows in question.

Finally, the topmost row (a third version of the software, or "Release 3.0" here) indicates a change in the Stack::push function definition; the change can be conveyed by a change in color. Similarly, the module Plates.cpp has also taken care of this change by updating its spatial locality.

At this point, should any defect end up being reported in Release 3.0, then the analytical tool shown in FIG. 2 will indicate that the spatial locality of the call in the MemoryDemo.cpp didn't change, meaning that there is a high probability that any "bug" could be traceable to the spatial locality of the call. In addition to this, the software developer can go back to the design and query as to why a particular workflow changed and the other didn't change. In the case of FIG. 2, the module Plates.cpp changed whereas the module MemoryDemo.cpp didn't change, thereby implicating a problem with the software design.

FIG. 3 provides another example. Here, the following interpretations can be made:

a) If there was an error reported after Release 3.0 then, since the spatial locality of the function call didn't change for the module Plates.cpp and the module MemoryDemo.cpp, a fix around those particular calls might be needed.

b) There was a problem reported with respect to the module Stack.cpp in Release 2.0 which the developer then fixed in Release 3.0; hence, no changes are needed around the function call.

c) There could be an error with Stack.cpp since it got changed if the error was reported after Release 3.0.

Thus, the user at this point will have three very specific interpretations which can be very easily investigated, rather than being burdened with a much larger number of potential interpretations that might take much longer to individually investigate or inquire into.

Another example is provided in FIG. 4, where the function definition has not changed for Release 3.0, but changes did take place for MemoryDemo.cpp. Thus, any errors reported after Release 3.0 could be traced to MemoryDemo.cpp, whereupon the developer could then look into other files if in fact the needed fix was not in MemoryDemo.cpp.

Finally, in the example of FIG. 5, if any errors were reported after Release 3.0 then the developer needs to check all the workflows. Particularly, in this case, the pattern set can involve any of nine patterns.

In general, an analytical tool as broadly contemplated herein in accordance with at least one embodiment of the invention to aid a developer in getting a high-level picture of what is taking place around function calls and why. As a result, the developer will be at least in a position to address basic questions such as whether something needs to be changed, and what most likely is in need of change relative to the type of error reported. Accordingly, the tool provides the developer with a "first cut" overview to look at and appreciate a "big picture" before proceeding to explore matters in greater detail.

It is to be understood that embodiments of the invention, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

Generally, embodiments may take the form of an entirely hardware embodiment, an entirely software embodiment or an embodiment containing both hardware and software elements. An embodiment that is implemented in software may include, but is not limited to, firmware, resident software, microcode, etc.

Furthermore, embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system, (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Embodiments of the invention have been presented for purposes of illustration and description but are not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Generally, although illustrative embodiments of the invention have been described herein with reference to the accompanying drawings, it is to be understood that the invention is not limited to those precise embodiments.

What is claimed is:

1. A computer apparatus comprising:

a main memory;

a querier held in the memory and executable by a processor in a manner which queries for a software function call towards determining spatial locality of where the function call occurs in one version of a source file;

said querier further acting to query for a scope of review of the function call;

a determiner held in the memory and executable by the processor in a manner which computes deltas in the spatial locality of where the function call occurs in different versions of the source file, the different versions including the one version; and a computer display responsive to the processor and displays to a user the computed deltas in spatial locality of where the function call occurs in different versions of the source file as indicative of changes in usage of the function call, said computed deltas in spatial locality being different from absence of occurrence of the function call in a spatial locality in the one version of the source file relative to occurrence of the function call in corresponding spatial locality in different versions of the source file.

2. The apparatus according to claim 1, wherein said querier further acts to prompt user input.

3. The apparatus according to claim 2, wherein said querier acts to prompt user input for a number of lines around the function call.

4. The apparatus according to claim 2, wherein said querier acts to prompt user input for a function scope in which the function call was made.

5. The apparatus according to claim 2, wherein said querier acts to prompt user input for a scope of a class in which the function call was made.

6. The apparatus according to claim 1, wherein said display by the computer display comprises a graphical user interface.

7. The apparatus according to claim 1, wherein said determiner acts to compute deltas between different versions of every file where the function call occurs.

8. A non-transitory program storage device readable by machine, the program storage device comprising:

a program of instructions tangibly embodied by the program storage device and executable by the machine to perform a method comprising:

querying for a software function call towards determining spatial locality of where the function call occurs in one version of a source file;

further querying for a scope of review of the function call;

computing deltas in the spatial locality of where the function call occurs in different versions of the source file, the different versions including the one version; and displaying to the user the computed deltas in spatial locality of where the function call occurs in different versions of the source file, wherein the computed deltas are indicative of changes in usage of the function call, said computed deltas in spatial locality being different from absence of occurrence of the function call in a spatial locality in the one version of the source file relative to occurrence of the function call in corresponding spatial locality in different versions of the source file.

9. The non-transitory program storage device according to claim 8, wherein said querying and said further querying comprise prompting user input.

10. The non-transitory program storage device according to claim 9, wherein:

said prompting comprises prompting user input for a number of lines around the function call; and said prompting further comprises prompting user input for a function scope in which the function call was made.

11. The non-transitory program storage device according to claim 9, wherein said prompting comprises prompting user input for a scope of a class in which the function call was made.

12. The non-transitory program storage device according to claim 8, wherein said displaying comprises displaying via a graphical user interface.

13. The non-transitory program storage device according to claim 8, wherein said computing comprises computing deltas between different versions of every file where the function call occurs.

* * * * *